(12) United States Patent
De Matos et al.

(10) Patent No.: US 11,530,756 B2
(45) Date of Patent: Dec. 20, 2022

(54) ELECTRIC ACTUATOR, ASSEMBLY, EXHAUST LINE AND VEHICLE COMPRISING SAID ACTUATOR

(71) Applicant: FAURECIA SYSTEMES D'ECHAPPEMENT, Nanterre (FR)

(72) Inventors: Raphael De Matos, Saone (FR); Julien Cambillard, Belfort (FR); François Lacouture, Besancon (FR); Alen Halepovic, Sainte Suzanne (FR)

(73) Assignee: FAURECIA SYSTEMES D'ECHAPPEMENT

( * ) Notice: Subject to any disclaimer, the term of this patent is extended or adjusted under 35 U.S.C. 154(b) by 41 days.

(21) Appl. No.: 17/108,222

(22) Filed: Dec. 1, 2020

(65) Prior Publication Data
US 2021/0164581 A1    Jun. 3, 2021

(30) Foreign Application Priority Data
Dec. 3, 2019   (FR) ..................... 19 13681

(51) Int. Cl.
*F16K 31/04* (2006.01)
*F01N 3/02* (2006.01)
*F02D 9/04* (2006.01)
*F02D 9/10* (2006.01)

(52) U.S. Cl.
CPC .......... *F16K 31/043* (2013.01); *F01N 3/0205* (2013.01); *F02D 9/04* (2013.01); *F02D 9/108* (2013.01); *F02D 9/1035* (2013.01); *F02D 9/1065* (2013.01)

(58) Field of Classification Search
CPC .. F01N 3/0205; F01N 13/087; F01N 2240/36; F01N 2390/02; F01N 2410/00; F02D 9/04; F02D 9/1035; F02D 9/1065; F02D 9/108; F02D 9/1085; F16K 31/043; H02K 11/40; H02K 5/08; H02K 5/225; H02K 2211/03; H02K 7/116; H02K 11/33; H02K 7/14
See application file for complete search history.

(56) References Cited

U.S. PATENT DOCUMENTS 7,007,666 B2 * 3/2006 Kamimura .............. F02D 11/10
123/399
7,845,616 B2 * 12/2010 Hatsuzawa .......... G01D 5/2073
137/554

(Continued)

FOREIGN PATENT DOCUMENTS

EP    2530284 A2    12/2012

OTHER PUBLICATIONS

French Search Report for FR Application No. 1913681 dated Jul. 29, 2020.

*Primary Examiner* — Phutthiwat Wongwian
*Assistant Examiner* — Susan E Scharpf
(74) *Attorney, Agent, or Firm* — Carlson, Gaskey & Olds, P.C.

(57) ABSTRACT

An electric actuator comprises a motor and a plate, wherein the motor has an electric contact in electrical contact with the plate. An intermediate shaft is in contact with the plate. A controller is fixed to an upper part of the actuator. The controller has an electrical output electrically communicating with the electric contact of the motor through the intermediate shaft and the plate.

21 Claims, 7 Drawing Sheets

(56) References Cited

U.S. PATENT DOCUMENTS

| | | | |
|---|---|---|---|
| 8,905,000 B2* | 12/2014 | Cowan | H02K 7/116 |
| | | | 123/399 |
| 9,546,606 B2* | 1/2017 | Cowan | F02D 9/105 |
| 9,657,650 B2* | 5/2017 | Khan | F02D 9/1065 |
| 2005/0073299 A1* | 4/2005 | Yoshikawa | G01D 11/245 |
| | | | 324/207.25 |
| 2007/0103010 A1* | 5/2007 | Kouzu | H02K 5/24 |
| | | | 310/51 |
| 2010/0180864 A1* | 7/2010 | Maekawa | F02M 19/12 |
| | | | 123/439 |
| 2012/0255379 A1* | 10/2012 | Lim | F02B 37/186 |
| | | | 74/42 |
| 2013/0160738 A1* | 6/2013 | Cowan | H02K 7/116 |
| | | | 123/399 |
| 2014/0060484 A1* | 3/2014 | Hiramoto | F02D 11/10 |
| | | | 310/83 |
| 2015/0275775 A1* | 10/2015 | Collet | F02M 26/72 |
| | | | 361/679.01 |
| 2015/0333603 A1* | 11/2015 | von Willich | H02K 5/08 |
| | | | 310/43 |
| 2015/0337743 A1* | 11/2015 | Cowan | F02D 9/1065 |
| | | | 261/64.2 |
| 2015/0337768 A1* | 11/2015 | Khan | F02D 9/1035 |
| | | | 261/64.1 |
| 2016/0265447 A1* | 9/2016 | Park | F02D 9/1065 |
| 2018/0187791 A1* | 7/2018 | Yamanaka | H02K 11/215 |

\* cited by examiner

ELECTRIC ACTUATOR, ASSEMBLY, EXHAUST LINE AND VEHICLE COMPRISING SAID ACTUATOR

CROSS-REFERENCE TO RELATED APPLICATIONS

This application is a U.S. non-provisional application claiming the benefit of French Application No. 19 13681, filed on Dec. 3, 2019, which is incorporated herein by reference in its entirety.

TECHNICAL FIELD

The disclosure relates to electric actuators, and more particularly, but not exclusively, to electric actuators provided with a plastic casing and exposed to harsh operating conditions.

BACKGROUND

Motor vehicle exhaust lines frequently include valves, with a valve body delimiting an exhaust gas circulation passage and a flap housed in the circulation passage. An electric actuator rotates the flap relative to the valve body.

It is possible to use an electric actuator having a plastic casing. The use of such actuators raises very specific problems, due to the fact that the geometry of the plastic casing is highly sensitive to temperature and humidity variations. The risk of malfunction of these electric actuators is high for this reason.

In order to decrease this malfunction risk and guarantee proper working of the actuator throughout its lifetime, it is imperative for the positioning allowance between the drive shaft and the intermediate shaft(s) of the reduction gear to be extremely strict.

To that end, US 2014/0091658 proposes to use a rigid metal plate, making it possible to position the drive shaft relative to the plastic casing. In this document, the casing is divided into a lower part in which the electric motor is housed, and an upper part bearing an electronic circuit by which the motor is connected to the power supply of the vehicle. An electric contact of the motor is connected to the electronic circuit when the upper part is locked on the lower part.

Furthermore, other members of the upper part must be matched up with elements of the lower part or with members borne by the lower part: fastening orifice of the screws, intermediate shaft receiving housing, etc.

As a result, the upper part must be made with machining allowances that are very difficult to respect, in particular when the casing is made from plastic.

In this context, the disclosure aims to propose electric actuator that does not have the above flaw.

SUMMARY

To that end, the disclosure relates to an electric actuator comprising:
  a casing having an upper part and a lower part, delimiting an inner volume between them;
  a motor received in a motor housing of the lower part, the motor housing communicating with the inner volume by an opening;
  a plate made from an electrically conductive material arranged on the opening, the plate having an orifice in which an upper end of the motor is engaged, a drive shaft bearing a drive pinion emerging from the upper end, the motor having an electric contact in electrical contact with the plate;
  an intermediate shaft made from an electrically conductive material bearing a toothed wheel meshing with the drive pinion, the intermediate shaft being engaged in an intermediate orifice of the plate and being in contact with the plate;
  a controller fixed to the upper body, the controller having an electrical output electrically communicating with the electric contact of the motor through the intermediate shaft and the plate.

Placing the controller and the electric contact of the motor in electrical contact through the intermediate shaft and the plate means that it is no longer necessary to provide, on the upper part, one or several specific members, separate from the intermediate shaft, dedicated to the electrical contact between the controller and the motor. The number of members of the upper part to be placed matching up with complementary members of the lower part is decreased. The production of the upper part is simplified and the assembly on the lower part is made easier.

The disclosure takes advantage of the presence of the plate and the intermediate shaft, which are initially provided for functions other than the transmission of an electric current between the controller and the motor.

The plate is in fact initially provided to limit the variations in the geometry of the casing of the actuator due to the temperature and the humidity, and in particular to keep the upper end of the motor in place, from which the drive shaft comes, as well as to guarantee the center distance of the first stage of the reduction gear.

The actuator may further have one or more of the features below, considered individually or according to any technical possible combination(s):
  the electrical output is an electric ground;
  the controller is configured to control the electric motor;
  a lower end of the intermediate shaft is engaged in a lower housing arranged in the lower part;
  an upper end of the intermediate shaft forms a position reference for the upper part relative to the lower part;
  the electrical output of the controller is directly electrically connected to the upper end of the intermediate shaft;
  the lower housing is delimited by a barrel arranged in the lower part and engaged in the intermediate orifice;
  the plate includes at least one bearing tab securing the upper part of the motor against a determined segment of a peripheral edge of the orifice, thus defining the position of the drive shaft relative to the plate;
  the plate comprises a motor zone bearing against the motor and urging the motor against a bottom of the motor housing, the plate further comprising a shaft zone in which the shaft orifice is arranged, and an intermediate zone separating the motor zone from the shaft zone, at least one stiffening relief being arranged in the intermediate zone;
  the plate includes an anti-rotation tab making it possible to prevent the rotation of the motor, and two lugs arranged on either side of the anti-rotation tab cooperating with the lower part in order to block the rotation of the plate relative to the lower part.

According to a second aspect, the disclosure relates to an assembly comprising:
  a valve having a valve body delimiting a circulation passage for fluid, for example exhaust gas, and a flap housed in the circulation passage;

an actuator having the above features, arranged to rotate the flap with respect to the valve body.

According to a third aspect, the disclosure pertains to a vehicle exhaust line, comprising an assembly having the above features.

According to a fourth aspect, the disclosure relates to a vehicle comprising an exhaust line having the above features.

BRIEF DESCRIPTION OF THE DRAWINGS

Other features and advantages of the disclosure will emerge from the following detailed description, provided for information and non-limitingly, in reference to the appended figures, in which.

DETAILED DESCRIPTION

Figure 1:
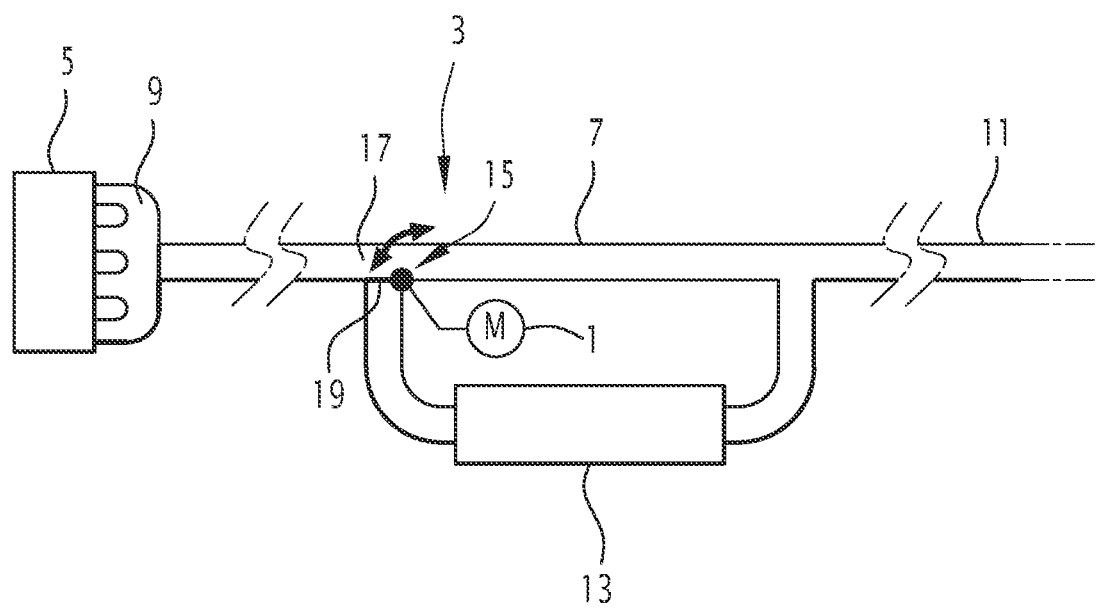
FIG. 1 is a simplified schematic illustration of an exhaust line according to the disclosure.

As shown by FIG. 1, the electric actuator 1 is particularly suitable for being used on a vehicle exhaust line 3. This vehicle is typically a vehicle equipped with a heat engine 5, and is for example a car, a truck, a bus or a two-wheeled vehicle.

In a variant, the electric actuator is integrated into any other type of equipment, embedded in a vehicle or not.

The electric actuator is typically used to rotate a valve flap, as described below.

In a variant, the electric actuator is arranged to perform another function.

As shown in FIG. 1, the exhaust line 3 comprises a main duct 7, a manifold 9 capturing the exhaust gases leaving the combustion chambers of the heat engine 5. Other equipment items, for example a turbocompressor or purification members or acoustic treatment members for the exhaust gases, are optionally inserted between the main segment 7 and the manifold 9.

The main segment 7 is connected in the downstream direction to a nozzle 11 by which the treated exhaust gases are discharged into the atmosphere. Other equipment items, such as purification equipment and/or one or several mufflers, are optionally inserted between the main segment 7 and the nozzle 11.

In the illustrated example, the exhaust line 3 includes a heat exchanger 13, connected in parallel to the main segment 7.

The exhaust line 3 further includes a valve 15. In the illustrated example, the valve 15 makes it possible to orient the exhaust gases selectively either toward the main segment 7 or toward the heat exchanger 13.

The valve 15 has a valve body 17 delimiting a circulation passage for the exhaust gas, and a flap 19 housed in the circulation passage.

The actuator 1 is provided to rotate the flap 19 relative to the valve body 17.

In the illustrated example, the valve is a three-way valve. The valve body 17 includes an inlet fluidly connected to the exhaust manifold 9, and two outlets fluidly connected one to the main segment 7 and the other to the heat exchanger 13.

In a variant, the valve 15 is a two-way valve.

The valve can further be arranged at other points of the exhaust line, between the decontamination system and an acoustic volume, or between a first acoustic volume and a second acoustic volume (intermediate and rear mufflers) or to the exhaust nozzle.

The valve can be inserted not on an exhaust gas circuit, but on a circuit in which another fluid flows.

The actuator 1 is an electric actuator.

It comprises a casing 21, with an upper part 23 and a lower part 25, delimiting an inner volume 27 between them.

The upper part 23 and/or the lower part 25 are typically made from plastic, advantageously an injected plastic. For example, the upper part 23 and/or the lower part 25 are made from PA66, PBT or PPA, these materials optionally being filled from 10 to 50% with glass fibers.

In a variant, the upper part 23 and/or the lower part 25 are made from metal, advantageously an injected metal. For example, the upper part 23 and/or the lower part 25 are made from an aluminum alloy or a stainless steel.

The upper part 23 has a concave upper bottom 29, having an edge with a closed contour 31. The closed-contour edge 31 is extended outward by a protruding skirt 33.

Likewise, the lower part 25 has a concave lower bottom 35, having an edge with a closed contour 37. The closed-contour edge 37 is extended outward by a protruding skirt 39. The concavities of the upper and lower bottoms 29, 35 face one another. The skirts 33, 39 are pressed against one another and make up flanges allowing the upper part 23 and the lower part 25 to be fastened to one another using any suitable method, for example by laser welding, micro-vibrations or ultrasound.

In a variant, the upper part 23 and the lower part 25 are fastened to one another by gluing, stapling or screwing. In this case, the skirts are not necessary.

The actuator 1 further includes a motor 41, received in a motor housing 43 of the lower part 25.

The motor 41 is typically a DC electric motor.

The motor housing 43 communicates with the inner volume 27 by an opening 45, arranged in the lower bottom 35. The motor housing 43 is delimited by a side wall 47, having a cylindrical shape in the illustrated example. Opposite the opening 45, the housing is closed by a bottom 49.

The actuator 1 further includes a plate 51 made from an electrically conductive material, arranged on the opening 45. The plate is visible in FIGS. 2 to 5, and is shown more precisely in FIG. 6.

The plate 51 has an orifice 52 in which an upper end 53 of the motor 41 is engaged. A drive shaft 55 protrudes from the upper part of the motor 41, and bears a drive pinion 57.

The plate 51 is typically made from an electrically conductive metal, for example stainless steel.

Figure 3:
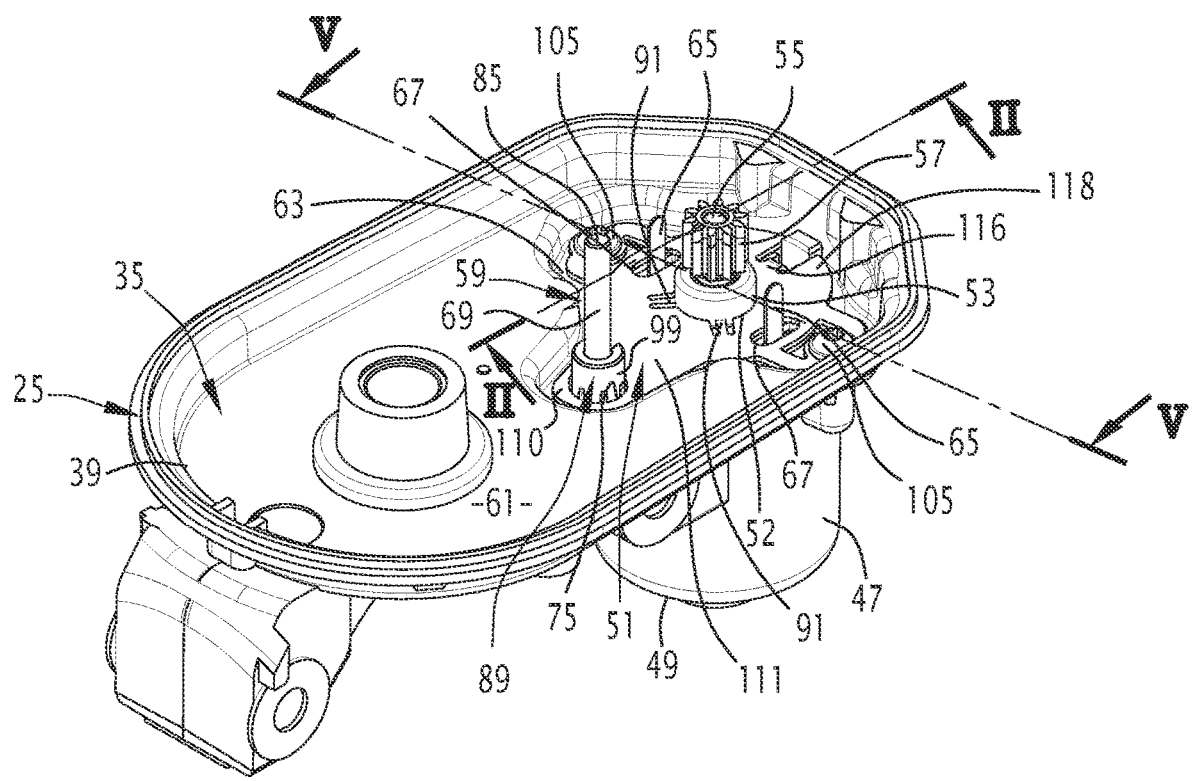
FIG. 3 is a perspective view of the lower part of the actuator of FIG. 2, also showing the plate, the intermediate shaft and the drive pinion.

As shown in particular in FIG. 3, the plate 51 is received in a hollow zone 59 formed in the lower bottom 35. In other words, the lower bottom 35 has a first substantially planar zone 61, the hollow zone 59 forming a depression relative to the zone 61. The zone 59 is hollow toward the inside of the inner volume 27 and protrudes toward the outside of the inner volume 27.

It is delimited by a substantially flat bottom 63, in which the opening 45 emerges. The plate 51 is placed on the bottom 63. The plate 51 is larger than the opening 45. It substantially covers the entire opening 45.

The drive shaft 55 extends substantially perpendicular to the plate 51.

The upper part 53 of the motor protrudes outside the motor housing 43 through the orifice 52, and is engaged in the inner volume 27.

The orifice 52 extends in line with the opening 45.

An electric contact 64 of the motor 41 is in electrical contact with the plate 51. This electric contact 64 is typically the conductive carcass of the motor 41.

Figure 2:
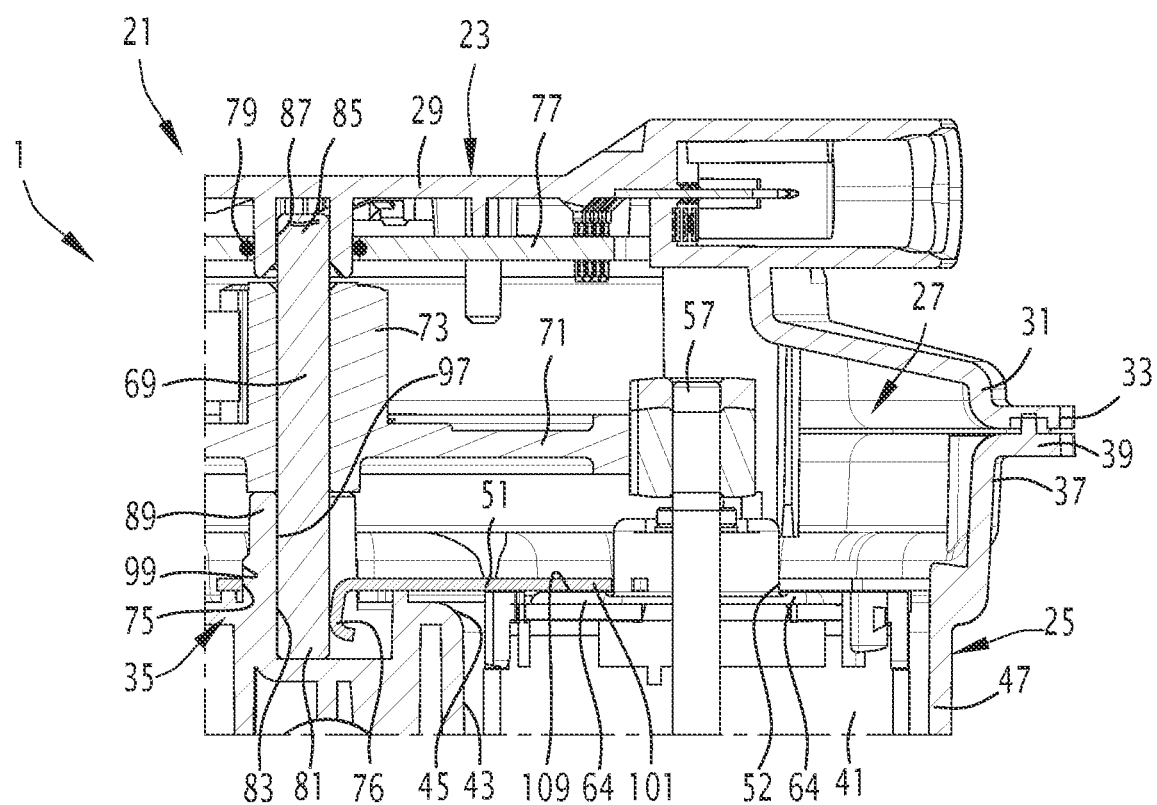
FIG. 2 is a partial sectional view of the actuator of FIG. 1, in the plane embodied by the arrows II of FIG. 3.
Figure 5:
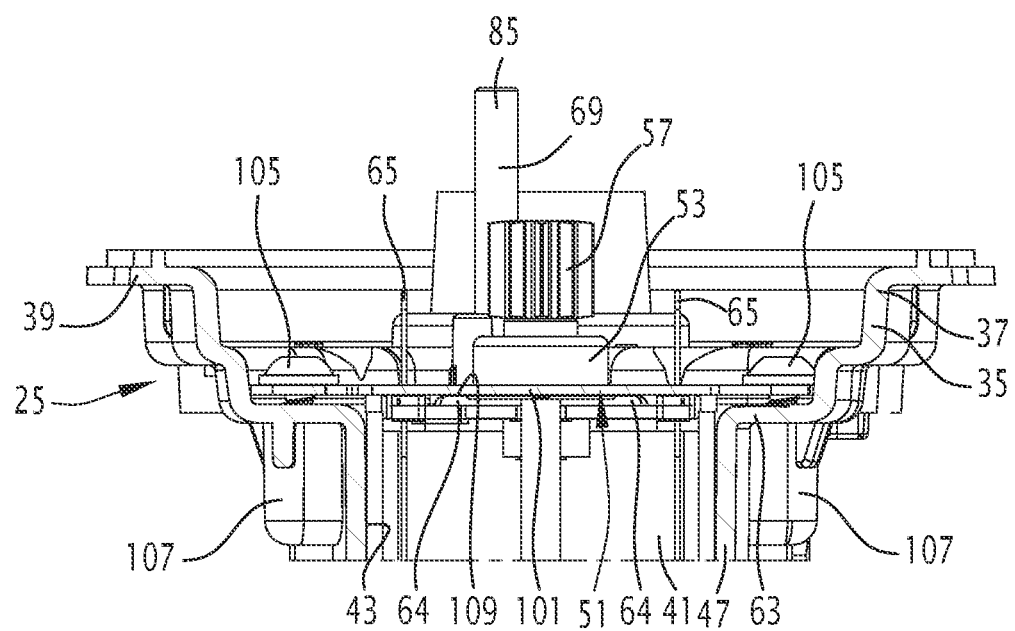
FIG. 5 is a sectional view along the incidence of arrows V of FIG. 3.

As shown in FIGS. 2 and 5, a zone of the conductive carcass located around the upper part 53 of the motor 41 is in contact with the lower surface of the plate 51.

This zone faces, in the axial direction defined by the drive shaft 55, toward the plate 51. It is located opposite the lower surface of the plate 51, and is in direct contact with said lower surface.

The lower surface is the large face of the plate 51 facing toward the bottom 63.

Figure 4:
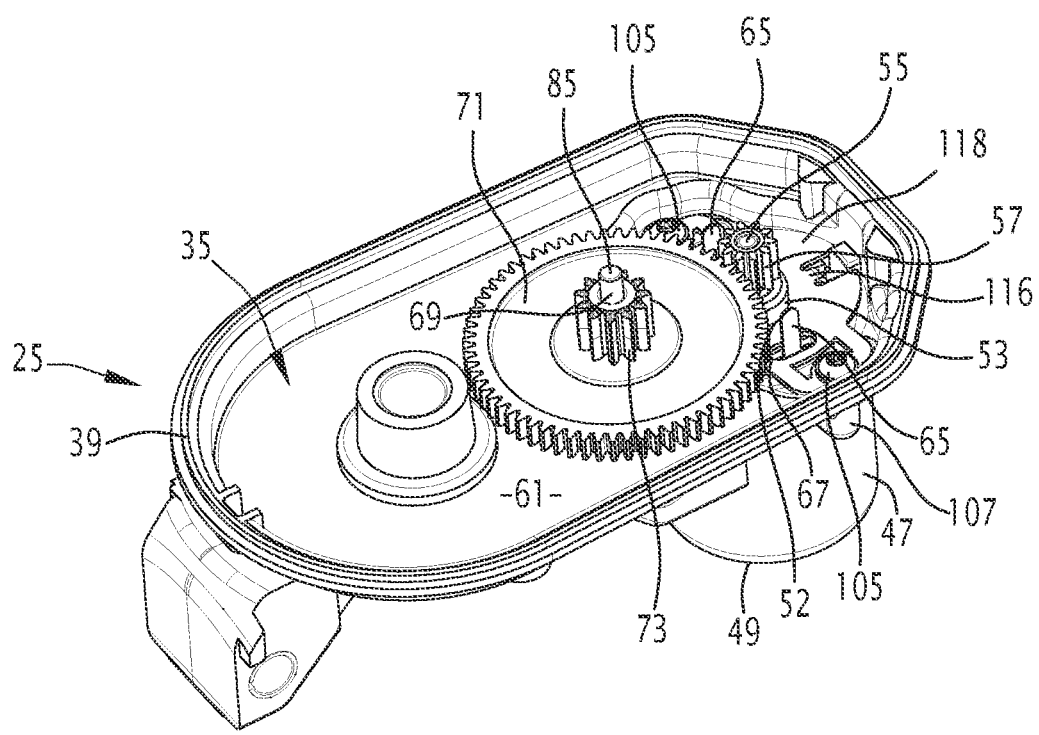
FIG. 4 is a view similar to that of FIG. 3, further showing the toothed wheel and the pinion borne by the intermediate shaft.

The motor 41 also comprises tabs 65 engaged in oblong orifices 67 of the plate 51, visible in FIGS. 3 to 5. The tabs 65 are the electric power supply terminals of the motor 41. They provide the electric power connection between the motor 41 and the controller controlling the motor, which will be described later.

The actuator 1 further comprises an intermediate shaft 69 made from an electrically conductive metal.

The conductive metal is typically a stainless steel.

The intermediate shaft 69 is substantially parallel to the drive shaft 55.

This intermediate shaft 69 bears a toothed wheel 71, meshing with the drive pinion 57 as illustrated in FIG. 4. FIG. 4 shows an intermediate pinion 73, secured in rotation with the toothed wheel 71. The intermediate pinion 73 meshes with a second toothed wheel, not shown, for example secured to an output shaft of the actuator. This output shaft is also not shown. The various pinions and the various toothed wheels make up a reduction gear, housed in the inner volume 27.

The intermediate shaft 69 is fixed relative to the upper part 23 and the lower part 25.

The toothed wheel 71 rotates around the intermediate shaft 69.

As shown in FIGS. 2 and 3, the intermediate shaft 69 is engaged in an intermediate orifice 75 of the plate. It is in electrical contact with the plate, for example via a material bridge 76 creating an electrical contact between the intermediate shaft and the plate.

Figure 6:
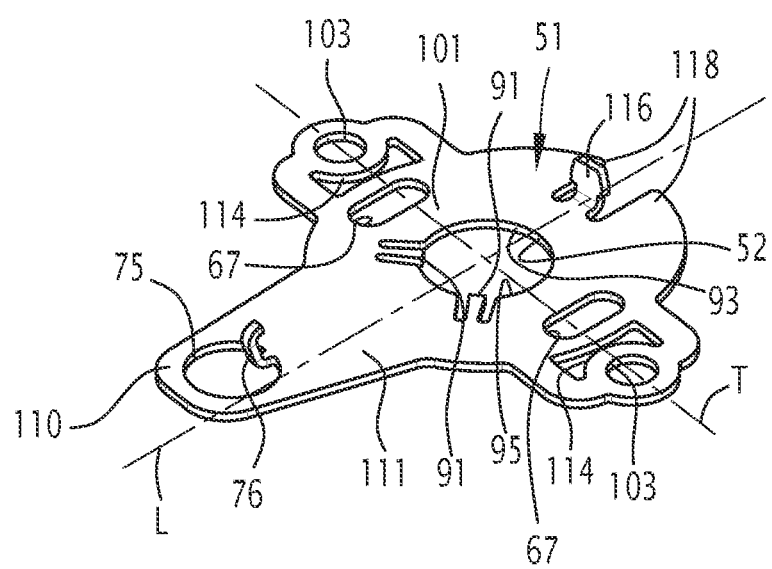
FIG. 6 is a perspective view of the plate of FIGS. 2 to 5.

Advantageously, the material bridge 76 is a tab coming from the plate 51 and protruding toward the inside of the intermediate orifice 75, as shown in FIG. 6.

The tab comprising the material bridge 76 is secured to the edge of the orifice 75. It is integral with the plate 51.

The actuator 1 further includes a controller 77, fastened to the upper part 23 (FIG. 2).

The controller 77 is configured to control the electric motor 41.

The controller 77 is typically an electronic board, that is to say a plate bearing a printed circuit.

The controller 77 has an electrical output 79 electrically communicating with the electric contact 64 of the motor through the intermediate shaft 69 and the plate 41.

The electrical output 79 is typically the ground of the controller 77. In the illustrated example, this ground is connected to the conductive carcass of the motor 41.

The electrical output 79 of the controller is directly electrically connected to the intermediate shaft 69.

As shown in FIG. 2, a lower end 81 of the intermediate shaft 69 is engaged in a lower housing 83 arranged in the lower part 25. An upper end 85 of the intermediate shaft 69 is engaged in an upper housing 87, arranged in the upper part 23. The upper end 85 of the intermediate shaft 69 forms a position reference for the upper part 23 relative to the lower part 25.

Indeed, the lower housing 83 has an inner section substantially corresponding to the outer section of the lower end 81. The position of the intermediate shaft 69 relative to the lower part 25, in a plane particular to the intermediate shaft 69, is therefore defined very precisely.

Likewise, the inner section of the upper housing 87 is substantially the same as the outer section of the upper end 85. The position of the upper part 23 relative to the intermediate shaft 69, in a plane substantially perpendicular to the intermediate shaft 69, is therefore defined extremely precisely.

As a result, the respective positions of the upper part 23 and the lower part 25 are defined very precisely relative to one another, in a plane perpendicular to the intermediate shaft 69, using this intermediate shaft.

Advantageously, the electrical output 79 of the controller is directly electrically connected to the upper end 85 of the intermediate shaft. This electrical connection is, for example, done using a tab, not shown.

As shown in FIG. 2, the lower housing 83 is delimited by a barrel 89 arranged in the lower part 25 and engaged in the intermediate orifice 75. The outer section of the barrel 89 corresponds very exactly to the inner section of the intermediate orifice 75.

A notch formed in the barrel 89 makes it possible to allow the tab comprising the material bridge 76 to pass, as shown by FIG. 2.

Furthermore, and as shown in FIG. 3, the plate 51 has press tabs 91, urging the upper part 53 of the motor against a determined segment 93 of the peripheral edge 95 of the orifice (FIGS. 3 and 6).

Indeed, the inner section of the orifice 52 is slightly larger than the outer section of the upper part 53 of the motor, taken perpendicular to the drive shaft 55.

The press tabs 91, of which there are two in the illustrated example, are for example placed at 120° from one another. Their respective free ends protrude slightly toward the inside of the orifice 52. Once the upper part 53 of the motor is engaged in the orifice 52, these tabs bear against the lateral surface of the upper part 53, and urge the latter against the edge segment 93. This makes it possible to precisely define the position of the drive shaft 55 relative to the plate 51.

In the actuator according to the Figure, the separation between the drive shaft 55 and the intermediate shaft 69 is thus perfectly controlled.

Indeed, the position of the drive shaft 55 relative to the plate 51 is perfectly controlled through the press tabs 91. Furthermore, the precision of the positioning of the intermediate shaft 69 relative to the plate 51 depends on the precision with which the inner 97 and outer 99 surfaces of the barrel 89 are positioned relative to one another.

These surfaces can be positioned relative to one another with great precision, due to the fact that they are both delimited by the same insert of the injection mold used to manufacture the lower part 25. This makes it possible to control the position of the inner surface 97 of the barrel 89 very well relative to the outer surface 99 of the barrel 89, the inner surface 97 commanding the position of the intermediate shaft 69 relative to the barrel 89, and the outer surface 99 of the position of the barrel 89 relative to the plate 51.

If these two surfaces were delimited by two different inserts from the same mold, it would be much more difficult to control their respective positions. The same thing would be true if these two surfaces were delimited by two zones of a same mold separated from one another.

Because the position of the intermediate shaft 69 relative to the plate 51 is well controlled, the position of the drive shaft 55 relative to said plate 51 is also well controlled and the plate 51 is made from metal, the positioning allowances of the drive shaft 55 relative to the intermediate shaft 69 are extremely reduced.

As shown in FIGS. 2 and 6, the plate 51 includes a motor zone 101 bearing against the motor 41 and urging the motor 41 against the bottom 49 of the motor housing 43. The orifice 52 is cut into the zone 101.

The oblong orifices 67 are also cut into the motor zone 101.

Furthermore, two fastening orifices 103 are arranged in the motor zone 101.

The fastening orifices 103 are arranged on either side of the orifice 52, in a transverse direction T shown in FIG. 6. Screws 105 are engaged through the fastening orifices 103, the threaded parts being screwed into housings 107 arranged in the lower part 25 (FIG. 5). The central part of the motor zone 101 bears on an upper surface 109 of the motor 41 that protrudes slightly relative to the bottom 63 of the hollow zone 59. On the contrary, the parts of the motor zone 101 in which the orifices 103 are arranged are pressed against the bottom 63. As a result, the zone 101 has slight flexion, not visible in the figures, the central part of the zone 101 being slightly offset toward the inside of the inner volume 27. The motor zone 101 thus resiliently urges the motor 41 against the bottom 49 of the housing 43.

The plate 51 also has a shaft zone 110, in which the intermediate orifice 75 is arranged, and an intermediate zone 111 separating the motor zone 101 from the shaft zone 110 (FIG. 6). The intermediate zone 111 and the shaft zone 110 form a material tongue extending longitudinally on one side of the motor zone 101.

The longitudinal direction L is embodied in FIG. 6. It is perpendicular to the transverse direction T.

Figure 7:
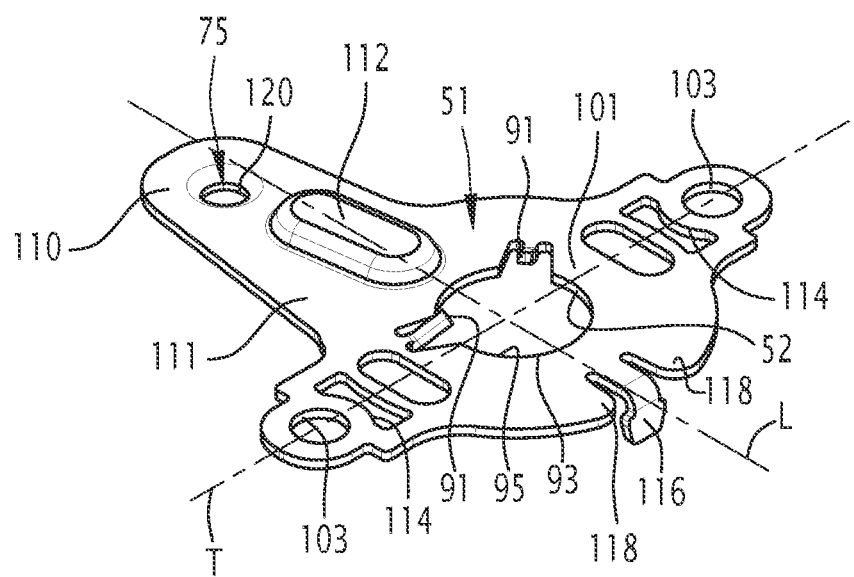
FIG. 7 is a perspective view of a variant of the plate of FIG. 6.

In a variant embodiment illustrated in FIG. 7, at least one stiffening relief 112 is arranged in the intermediate zone 111. This relief 112 is obtained by deformation of the plate 51, for example by stamping. In the illustrated example, the relief 112 is a longitudinally elongated boss. The stiffening relief(s) 112 make it possible to prevent the creep phenomenon, and the propagation of deformations from the motor zone 101 to the shaft zone 110. Cutouts 114 made in the motor zone 101 near the orifices 103 facilitate the flexion of the motor zone 101.

Advantageously, the plate 51 includes an anti-rotation tab 116 preventing the motor 41 from rotating relative to the plate 51. Two lugs 118 arranged on either side of the anti-rotation tab 116 cooperate with the lower part 25 in order to block the rotation of the plate 51 relative to the lower part 25.

According to another variant embodiment shown in FIG. 7, the electrical contact between the intermediate shaft 69 and the plate 51 is achieved by a shaft collar 120, formed on the peripheral edge of the intermediate orifice 75 of the plate 51. The shaft collar 120 has an inner section corresponding to the outer section of the intermediate shaft 69. This shaft is engaged in the shaft collar 120, and is in contact with the shaft collar 120 over substantially its entire periphery.

The disclosure has been illustrated and described in detail in the drawings and the preceding description. The latter must be considered to be illustrative and provided as an example, and not as limiting the disclosure to this description alone. Many embodiment variants are possible.

The invention claimed is:

1. An electric actuator, comprising:
   a casing having an upper part and a lower part, delimiting an inner volume between them;
   a motor received in a motor housing of the lower part, the motor housing communicating with the inner volume by an opening;
   a plate made from an electrically conductive material arranged on the opening, the plate having a drive shaft orifice in which an upper end of the motor is engaged, a drive shaft emerging from the upper end, the drive shaft supporting a drive pinion, the motor having an electric contact in electrical contact with the plate, wherein an end part of the drive shaft supporting the drive pinion is located on a side of the plate opposite to the motor housing;
   an intermediate shaft made from an electrically conductive material and supporting a toothed wheel meshing with the drive pinion, the intermediate shaft being engaged in an intermediate orifice of the plate and being in contact with the plate; and
   a controller fixed to the upper part, the controller having an electrical output electrically communicating with the electric contact of the motor through the intermediate shaft and the plate.

2. The actuator according to claim 1, wherein the electrical output is an electric ground.

3. The actuator according to claim 1, wherein the controller is configured to control the motor.

4. The actuator according to claim 1, wherein a lower end of the intermediate shaft is engaged in a lower housing arranged in the lower part.

5. The actuator according to claim 4, wherein an upper end of the intermediate shaft forms a position reference for the upper part relative to the lower part.

6. The actuator according to claim 5, wherein the electrical output of the controller is directly electrically connected to the upper end of the intermediate shaft.

7. The actuator according to claim 4, wherein the lower housing is delimited by a barrel made in the lower part and engaged in the intermediate orifice.

8. The actuator according to claim 1, wherein the plate comprises a motor zone resting against the motor and urging the motor against a bottom of the motor housing, the plate further comprising a shaft zone in which the drive shaft orifice is arranged, and an intermediate zone separating the motor zone from the shaft zone, at least one stiffening relief being arranged in the intermediate zone.

9. An assembly comprising:
   a valve having a valve body delimiting a circulation passage for fluid, and a flap housed in the circulation passage; and
   the actuator according to the claim 1 arranged to rotate the flap with respect to the valve body.

10. A vehicle exhaust line comprising the assembly according to claim 9.

11. A vehicle comprising the vehicle exhaust line according to claim 10.

12. The assembly according to claim 9, wherein the fluid comprises exhaust gas.

13. The actuator according to claim 1, wherein the plate is secured to the lower part of the casing.

14. The actuator according to claim 1, wherein the lower part of the casing is made of a plastic material.

15. The actuator according to claim 1, wherein the plate has a first surface facing the motor housing and a second surface opposite the first surface and facing the inner volume.

16. The actuator according to claim 15, wherein the drive shaft orifice is a through opening, opening on both the first surface and the second surface of the plate.

17. The actuator according to claim 15, wherein the upper end of the motor passes through the opening and has the end part protruding with respect to the second surface of the plate.

18. The actuator according to claim 15, wherein the intermediate orifice is a through opening, opening on both the first surface and the second surface of the plate.

19. The actuator according to claim 15, wherein the intermediate shaft passes through the intermediate orifice and has a part protruding with respect to the second surface of the plate.

20. An electric actuator, comprising:
a casing having an upper part and a lower part, delimiting an inner volume between them;
a motor received in a motor housing of the lower part, the motor housing communicating with the inner volume by an opening;
a plate made from an electrically conductive material arranged on the opening, the plate having a drive shaft orifice in which an upper end of the motor is engaged, a drive shaft emerging from the upper end, the drive shaft supporting a drive pinion, the motor having an electric contact in electrical contact with the plate, and wherein the plate includes at least one securing tab urging the upper end of the motor against a determined segment of a peripheral edge of the drive shaft orifice, thus defining a position of the drive shaft relative to the plate an intermediate shaft made from an electrically conductive material and supporting a toothed wheel meshing with the drive pinion, the intermediate shaft being engaged in an intermediate orifice of the plate and being in contact with the plate; and
a controller fixed to the upper part, the controller having an electrical output electrically communicating with the electric contact of the motor through the intermediate shaft and the plate.

21. An electric actuator, comprising:
a casing having an upper part and a lower part, delimiting an inner volume between them;
a motor received in a motor housing of the lower part, the motor housing communicating with the inner volume by an opening;
a plate made from an electrically conductive material arranged on the opening, the plate having a drive shaft orifice in which an upper end of the motor is engaged, a drive shaft emerging from the upper end, the drive shaft supporting a drive pinion, the motor having an electric contact in electrical contact with the plate, and wherein the plate includes an anti-rotation tab to prevent rotation of the motor, and two lugs arranged on either side of the anti-rotation tab cooperating with the lower part in order to block rotation of the plate relative to the lower part an intermediate shaft made from an electrically conductive material and supporting a toothed wheel meshing with the drive pinion, the intermediate shaft being engaged in an intermediate orifice of the plate and being in contact with the plate; and
a controller fixed to the upper part, the controller having an electrical output electrically communicating with the electric contact of the motor through the intermediate shaft and the plate.

* * * * *